(12) United States Patent
Thubert et al.

(10) Patent No.: US 11,539,613 B2
(45) Date of Patent: Dec. 27, 2022

(54) GENERATING CROSS-PAN BYPASS PATH BASED ON STITCHING BETWEEN BORDER LLN DEVICES

(71) Applicant: Cisco Technology, Inc., San Jose, CA (US)

(72) Inventors: Pascal Thubert, Roquefort les Pins (FR); Huimin She, Shanghai (CN); Ling Wei, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 17/213,393

(22) Filed: Mar. 26, 2021

(65) Prior Publication Data

US 2022/0311693 A1    Sep. 29, 2022

(51) Int. Cl.
*H04L 45/02* (2022.01)
*H04L 12/46* (2006.01)

(52) U.S. Cl.
CPC .......... *H04L 45/02* (2013.01); *H04L 12/4633* (2013.01)

(58) Field of Classification Search
USPC ....................................................... 370/254
See application file for complete search history.

(56) References Cited

U.S. PATENT DOCUMENTS

| 7,190,678 | B2 | 3/2007 | Thubert et al. |
| 7,203,175 | B2 | 4/2007 | Thubert et al. |
| 8,102,775 | B2 | 1/2012 | Thubert |
| 9,001,669 | B2 * | 4/2015 | Vasseur ............... H04L 67/12 370/242 |
| 9,246,794 | B2 * | 1/2016 | Thubert ............... H04L 45/18 |
| 9,344,256 | B2 | 5/2016 | Thubert et al. |
| 9,935,868 | B2 | 4/2018 | Hui et al. |
| 9,980,199 | B2 | 5/2018 | Thubert et al. |

(Continued)

FOREIGN PATENT DOCUMENTS

WO    WO-2019141970 A1 *    7/2019

OTHER PUBLICATIONS

Wang et al., "Cross Personal Area Network Communication By Connected Grid Mesh Network In Lighting Area", Technical Disclosure Commons, May 1, 2019, [online], [retrieved on Dec. 3, 2020], Retrieved from the Internet: URL: <https://www.tdcommons.org/cgi/viewcontent.cgi?article=3233&context=dpubs_series>, pp. 1-11.

(Continued)

*Primary Examiner* — Anthony Mejia
(74) *Attorney, Agent, or Firm* — Behmke Innovation Group; James M. Behmke; Jonathon P. Western

(57) ABSTRACT

In one embodiment, a method comprises determining, by a controller device in a low power and lossy network (LLN), that a first LLN border device is in a first personal area network (PAN) having a first directed acyclic graph (DAG) topology, and that the first LLN border device is a neighbor of a second LLN border device in a second PAN of the LLN having a second DAG topology; receiving a path request for a third LLN device in the first PAN to reach a fourth LLN device in the second PAN; and generating an inter-PAN path between the third LLN device and the fourth LLN device via the first and second LLN border devices, the inter-PAN path providing a stitching between the first DAG topology and the second DAG topology.

20 Claims, 8 Drawing Sheets

(56) References Cited

U.S. PATENT DOCUMENTS

| | | | |
|---|---|---|---|
| 10,015,075 B1* | 7/2018 | Yang | H04L 45/48 |
| 10,439,871 B2* | 10/2019 | Thubert | H04L 43/16 |
| 10,749,786 B2 | 8/2020 | Thubert et al. | |
| 10,938,707 B2 | 3/2021 | She et al. | |
| 11,368,393 B2* | 6/2022 | Vedantham | H04L 45/02 |
| 2012/0213124 A1* | 8/2012 | Vasseur | H04L 41/12 370/255 |
| 2013/0031253 A1 | 1/2013 | Hui et al. | |
| 2013/0208583 A1 | 8/2013 | Guo et al. | |
| 2018/0109551 A1* | 4/2018 | Wetterwald | H04L 63/029 |
| 2019/0004587 A1* | 1/2019 | Van Wyk | G06F 1/3234 |
| 2019/0165961 A1* | 5/2019 | Bartier | H04L 12/185 |
| 2019/0306048 A1 | 10/2019 | Jadhav et al. | |
| 2019/0349786 A1 | 11/2019 | Hett et al. | |
| 2020/0007425 A1* | 1/2020 | Monier | H04L 43/10 |
| 2020/0014618 A1* | 1/2020 | Thubert | H04W 28/0231 |
| 2020/0099543 A1* | 3/2020 | Taylor | H04L 45/04 |
| 2020/0259678 A1 | 8/2020 | Thubert et al. | |
| 2020/0259736 A1* | 8/2020 | She | H04L 45/02 |
| 2020/0296001 A1 | 9/2020 | She et al. | |
| 2020/0314005 A1* | 10/2020 | Hanley | H04L 45/48 |

OTHER PUBLICATIONS

She et al., "Distributed Destination Advertisement Object (DAO) Projection For Peer-To-Peer Routing In Low Power And Lossy Networks (LLNS)", Technical Disclosure Commons, Oct. 21, 2019, [online], [retrieved on Dec. 3, 2020]. Retrieved from the Internet:URL:<https://www.tdcommons.org/cgi/viewcontent.cgi?article=3660&context=dpubs_series>, pp. 1-5.

Hui et al., "An IPv6 Routing Header for Source Routes with the Routing Protocol for Low-Power and Lossy Networks (RPL)", Internet Engineering Task Force (IETF), Request for Comments: 6554, Mar. 2012, [online], [retrieved on Mar. 5, 2021]. Retrieved from the Internet: URL:<https://tools.ietf.org/pdf/rfc6554.pdf>, pp. 1-13.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., et al., "Routing for RPL Leaves", ROLL Internet Draft, Nov. 10, 2020, [online], [retrieved on Feb. 23, 2021], Retrieved from the Internet: URL:< https://tools.ietf.org/pdf/draft-ietf-roll-unaware-leaves-23.pdf>, pp. 1-39.

Thubert, Ed., et al., "Root initiated routing state in RPL", Roll Internet Draft, Nov. 17, 2019, [online], [retrieved on Dec. 8, 2020], Retrieved from the Internet: URL: <https://tools.ietf.org/pdf/draft-ietf-roll-dao-projection-09.pdf>, pp. 1-31.

Anamalamudi et al., "AODV based RPL Extensions for Supporting Asymmetric P2P Links in Low-Power and Lossy Networks", ROLL Internet Draft, Feb. 2, 2021, [online], [retrieved on Feb. 23, 2021], Retrieved from the Internet: URL: <https://tools.ietf.org/pdf/draft-ietf-roll-aodv-rpl-09.pdf>, pp. 1-28.

Thubert Ed., "An Architecture for IPv6 over the TSCH mode of IEEE 802.15.4", 6TiSCH Internet Draft, Oct. 29, 2019, [online], [retrieved on Mar. 9, 2021]. Retrieved from the Internet: URL: <https://tools.ietf.org/pdf/draft-ietf-6tisch-architecture-28.pdf>, pp. 1-69.

Thubert, "RE: Make P-DAO bidirectional [extends] IETF 109 open Questions on P-DAO", E-mail to IETF Routing Over Low power and Lossy networks Working Group, Nov. 27, 2020, pp. 1-7.

Zhang et al., "MPLS Inter-Autonomous System (AS) Traffic Engineering (TE) Requirements", Network Working Group, Request for Comments: 4216, Nov. 2005, [online], [retrieved on Feb. 25, 2021]. Retrieved from the Internet: URL: <https://www.rfc-editor.org/rfc/pdfrfc/rfc4216.txt.pdf>, pp. 1-29.

Thubert, Ed., et al., "Root initiated routing state in RPL", ROLL Internet Draft, Jan. 15, 2021, [online], [retrieved on Mar. 24, 2021]. Retrieved from the Internet: URL: <https://tools.ietf.org/pdf/draft-ietf-roll-dao-projection-16.pdf>, pp. 1-50.

* cited by examiner

GENERATING CROSS-PAN BYPASS PATH BASED ON STITCHING BETWEEN BORDER LLN DEVICES

TECHNICAL FIELD

The present disclosure generally relates to generating a cross-personal area network (PAN) path based on stitching between border low power and lossy network (LLN devices).

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power and Lossy Networks (LLNs) allow a large number (e.g., tens of thousands) of resource-constrained devices (i.e., LLN devices) to be interconnected to form a wireless mesh network. Each LLN device in the LLN typically is constrained by processing power, memory, and energy (e.g., battery power); interconnecting links between the LLN devices typically are constrained by high loss rates, low data rates, and instability with relatively low packet delivery rates. Hence, LLN devices typically rely on a centralized entity such as root network device and/or a path computation element (PCE) device to establish numerous Internet Protocol (IP) based routing paths for the LLN devices within a PAN, for example based on establishing a Destination Oriented Directed Acyclic Graph (DODAG) according to the Internet Engineering Task Force (IETF) Request for Comments 6550. Various proposals exist for optimizing routing paths in a DODAG in a manner that enables LLN devices to bypass a root network device which often can suffer as a "bottleneck" in the DODAG, described in detail for example in U.S. Pat. No. 10,749,786, assigned to Cisco Technology, Inc.

A fundamental problem in existing proposals for implementing a DODAG within an LLN is that any attempt for optimizing routing paths operate only within one routing domain, i.e., within only one PAN having a corresponding DODAG topology. Hence, peer-to-peer routing is not implemented across DODAGs, resulting in the necessity of all inter-PAN traffic to be routed via the root network devices of the respective DODAGs. Hence, a network can suffer limited scalability as a large scale LLN (e.g., a smartgrid) is split dynamically into multiple DODAGs, where inter-PAN traffic between DODAGs must be routed via the respective root network devices that can become "bottlenecks" for inter-PAN traffic.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
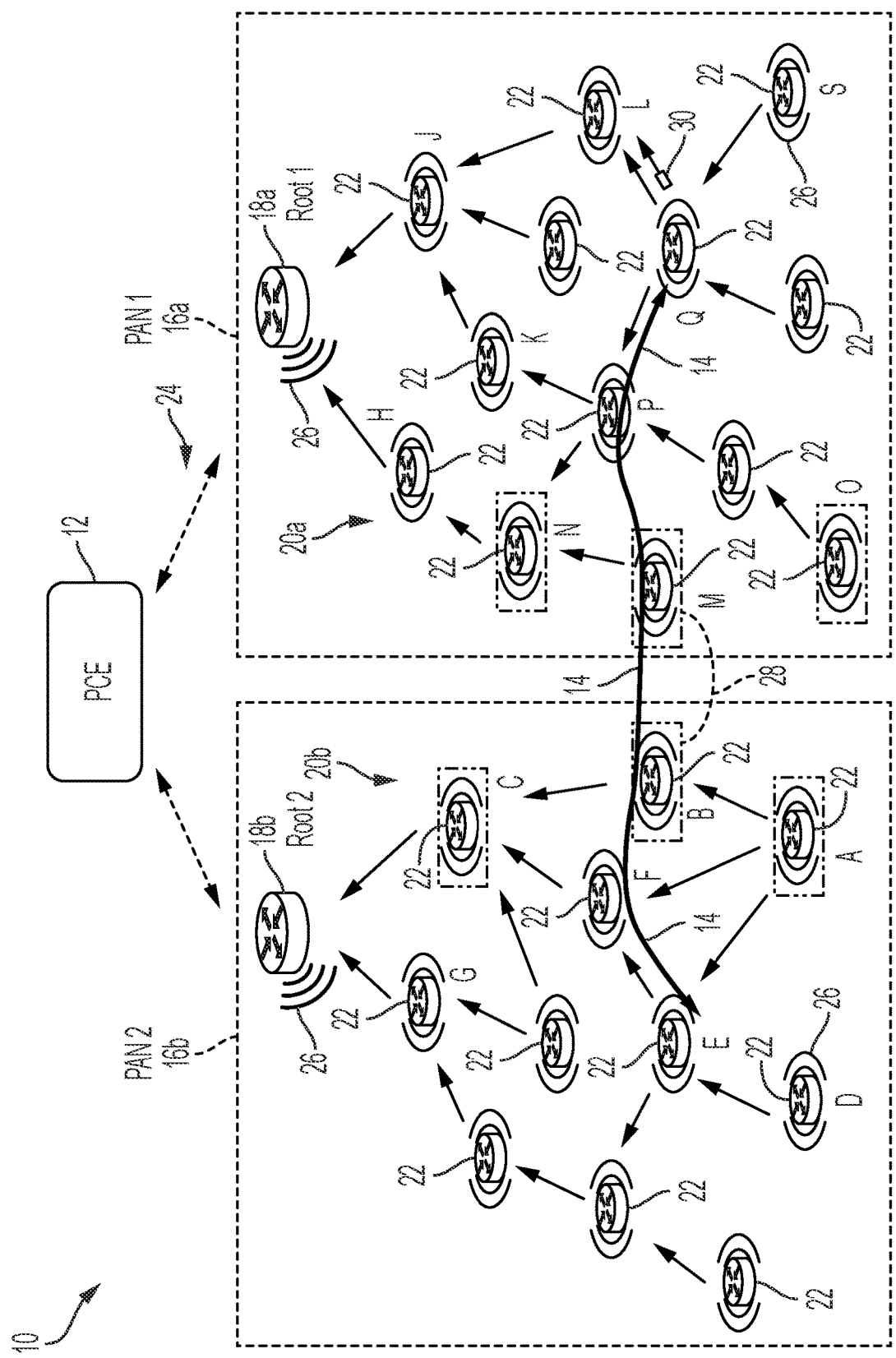
FIG. 1 illustrates an example low-power and lossy network (LLN) having an apparatus for generating an inter-PAN path for deployment across neighboring LLN border devices that are deployed within respective personal area networks (PANs), according to an example embodiment.

In one embodiment, a method comprises: determining, by a controller device in a low power and lossy network (LLN), that a first LLN border device is in a first personal area network (PAN) having a first directed acyclic graph (DAG) topology in the LLN, and that the first LLN border device is a neighbor of a second LLN border device in a second PAN of the LLN, the second PAN having a second DAG topology; receiving, by the controller device, a path request for a third LLN device in the first PAN to reach a fourth LLN device; determining, by the controller device, that the fourth LLN device is in the second PAN; generating, by the controller device, an inter-PAN path between the third LLN device and the fourth LLN device via the first and second LLN border devices, the inter-PAN path providing a stitching between the first DAG topology and the second DAG topology; and causing, by the controller device, the inter-PAN path to be deployed between the third LLN device and the fourth LLN device.

In another embodiment, an apparatus is implemented as a physical machine. The apparatus comprises: non-transitory machine readable media configured for storing executable machine readable code; a device interface circuit configured for receiving a data packet via a low power and lossy network (LLN); and a processor circuit. The processor circuit is configured for executing the machine readable code, and when executing the machine readable code operable for: determining, by the apparatus implemented as a controller device in the LLN, that a first LLN border device is in a first personal area network (PAN) having a first directed acyclic graph (DAG) topology in the LLN, and that the first LLN border device is a neighbor of a second LLN border device in a second PAN of the LLN, the second PAN having a second DAG topology; receiving a path request for a third LLN device in the first PAN to reach a fourth LLN device; determining that the fourth LLN device is in the second PAN; generating an inter-PAN path between the third LLN device and the fourth LLN device via the first and second LLN border devices, the inter-PAN path providing a stitching between the first DAG topology and the second DAG topology; and causing the inter-PAN path to be deployed between the third LLN device and the fourth LLN device.

In another embodiment, one or more non-transitory tangible media are encoded with logic for execution by a machine and when executed by the machine operable for: determining, by the machine implemented as a controller device in a low power and lossy network (LLN), that a first LLN border device is in a first personal area network (PAN) having a first directed acyclic graph (DAG) topology in the LLN, and that the first LLN border device is a neighbor of a second LLN border device in a second PAN of the LLN, the second PAN having a second DAG topology; receiving a path request for a third LLN device in the first PAN to reach a fourth LLN device; determining that the fourth LLN device is in the second PAN; generating an inter-PAN path between the third LLN device and the fourth LLN device via the first and second LLN border devices, the inter-PAN path providing a stitching between the first DAG topology and the second DAG topology; and causing the inter-PAN path to be deployed between the third LLN device and the fourth LLN device.

DETAILED DESCRIPTION

Particular embodiments enable a controller device, for example a path computation element (PCE) in a low power and lossy network (LLN), to provide a scalable optimization of inter-PAN bypass paths that can route network traffic between PANs via neighboring LLN border devices and thus bypass the respective root network devices of the PANsment w. The particular embodiments enable one or more PCEs to identify neighboring LLN border devices that are deployed within respective PANs having respective directed acyclic graph (DAG) topologies. The one or more PCEs can generate an inter-PAN path for routing network traffic from a source LLN device in a first PAN (also referred to herein as a "source PAN" having a source "DAG") to a destination LLN device in another different PAN (also referred to herein as a "destination "PAN"), via an LLN border device in the source PAN and a next-hop neighboring LLN border device in the next PAN (e.g., the destination PAN).

Hence, the example embodiments enable a scalable establishment of an inter-PAN path that bypasses the root devices of the respective PANs and their associated DAGs. The inter-PAN path provides a stitching between the source DAG and the destination DAG based on utilizing a neighboring link layer connection between the first and second LLN border devices.

FIG. 1 is a diagram illustrating an example LLN 10 having a PCE controller device 12 configured for generating an inter-PAN path 14 for deployment across wireless personal area networks (PANs) 16 (e.g., 16a and 16b), according to an example embodiment. The PCE controller device 12 can be configured for controlling a PAN 16 based on communications with a root network device 18 in a corresponding PAN 16. As illustrated in FIG. 1, the PCE controller device 12 can be configured for controlling the PAN "PAN1" 16a via the corresponding root network device "Root 1" 18a; the PCE controller device 12 also can be configured for controlling the PAN "PAN2" 16b via the corresponding root network device "Root 2" 18b. For example, the PCE controller device 12 can cause each root network device 18a, 18b to establish a corresponding DAG topology 20a, 20b according to RFC 6550 in the form of a DODAG, enabling wireless LLN devices 22 to join a particular DAG topology 20 for communications with the corresponding root network device 18.

As apparent from the foregoing, prior deployments of a PAN 16 have required that all communications within a DAG topology 20 of a PAN 16 are managed by the corresponding root network device 18 and/or its associated PCE 12. Hence, a root network device 18 could generate an optimized routing path between wireless LLN devices 22 only within the same PAN 16: for example, the root network device "Root1" 18a could generate an example optimized routing path from "M" to "Q" (e.g., via "P") that bypasses the root network device "Root1" 18a and the common parent LLN device "N", and the root network device "Root2" 18b could generate an example optimized routing path from "B" to "E" that bypasses the root network device "Root2" 18b and the common parent LLN device "C". However, prior deployments still would require any communications between the first PAN 16a and the second PAN 16b (e.g., between the LLN device "S" and the LLN device "D") to traverse a path that included the root network device "Root1" 18a and the root network device "Root2" 18b and any associated backhaul network 24 between the root network devices 18a and 18b. Hence, use of any paths including the root network device "Root1" 18a and the root network device "Root2" 18b and any associated backhaul network 24 between the root network devices 18a and 18b would not be scalable in large scale LLNs due to the ever-increasing traffic burdens on the root network devices 18a and 18b and the first-hop parent network devices (e.g., "C", "G", "H", "J") 22 required to forward the traffic between the PANs 16a and 16b via wireless data links 26.

As described in further detail below, the example embodiments enable the PCE controller device 12 to determine that a first LLN border device (e.g., "M") 22 is in a "first" first PAN 16a having a first DAG topology 20a in the LLN 10; the PCE controller device 12 also can determine that the first LLN border device (e.g., "M") 22 is a neighbor of a second LLN border device (e.g., "B") 22 in a second PAN 16b of the LLN 10, the second PAN 16b having a second DAG topology 20b. The PCE controller device 12 also can determine an inter-PAN path 14 between the first PAN 16a and second PAN 16b, for example based on receiving a path request 30 for a third LLN device (e.g., "Q") 22 in the first PAN 16a to reach a fourth LLN device (e.g., "E") 22, where the PCE controller device 12 determines that the fourth LLN device (e.g., "E") 22 is in the second PAN 16b. Hence, the PCE controller device 12 can generate an inter-PAN path 14 between the third LLN device "Q" 22 and the fourth LLN device "E" 22 via the first LLN border device "M" 22 and the second LLN border device "B" 22 that are interconnected by a neighboring link layer connection 28.

Hence, the inter-PAN path 14 can provide a stitching between the first DAG topology 20a and the second DAG topology 20b, based on utilizing a neighboring link layer connection 28 between the LLN border devices "M" and "B" 22, enabling the inter-PAN path 14 between the source DAG topology 20a (operating as a source DAG) and the destination DAG topology 20b (operating as a destination DAG) to bypass the associated root network devices 18a and 18b.

As described below with respect to FIG. 6, the example embodiments also can be applied to an LLN 10' having multiple PCE controller devices 12 (e.g., 12a, 12b, 12c) for control of respective PANs 16a, 16b, 16c, where each of the PCE controller devices 12a, 12b, and 12c can exchange routing information for establishment of an inter-PAN path 14' across a source PAN 16b, one or more intermediate PANs 16c, and a destination PAN 16a.

Although only the network devices "Root1" 18a, "Root2" 18b, "D" 22, and "S" 22 have wireless data links (illustrated as curved lines "(( ))") illustrated with the reference numeral 26 to avoid cluttering, it should be apparent that all wireless data links of all the network devices 18 and 22 are allocated the reference numeral "26" for purposes of the description herein.

Figure 2:
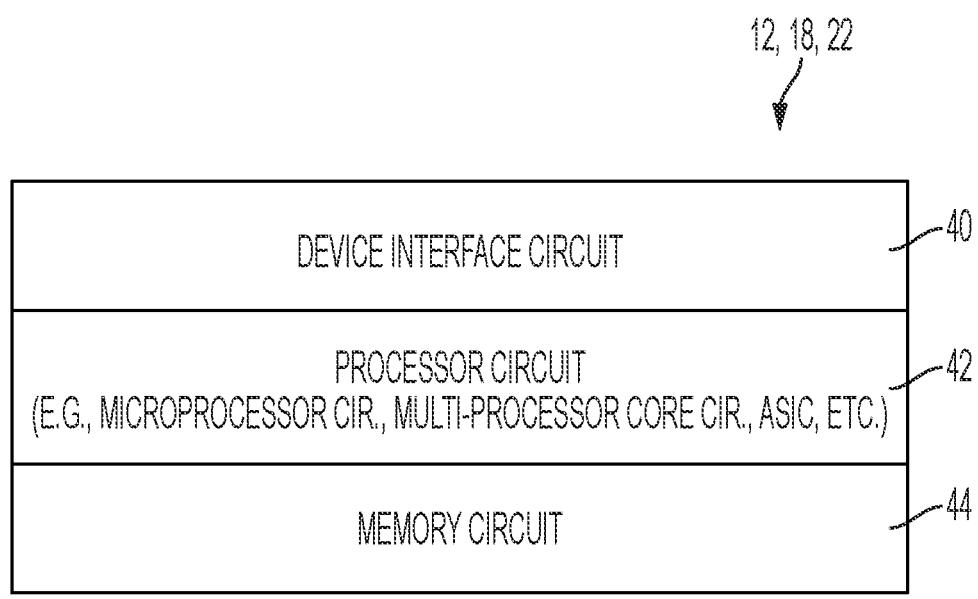
FIG. 2 illustrates an example implementation of any one of the devices of FIG. 1 or 6, according to an example embodiment.

FIG. 2 illustrates an example implementation of any one of the devices 12, 18, and/or 22 of FIG. 1, according to an example embodiment. Each apparatus 12, 18, and/or 22 a physical machine (i.e., a hardware device "apparatus") configured for implementing network communications with other physical machines via the LLN 10. The term "configured for" or "configured to" as used herein with respect to a specified operation refers to a device and/or machine that is physically constructed and arranged to perform the specified operation.

Each apparatus 12, 18, and/or 22 can include a device interface circuit 40, a processor circuit 42, and a memory circuit 44. The device interface circuit 40 can include one or more distinct physical layer transceivers for communication with any one of the other devices 12, 18, and/or 22; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 18, and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
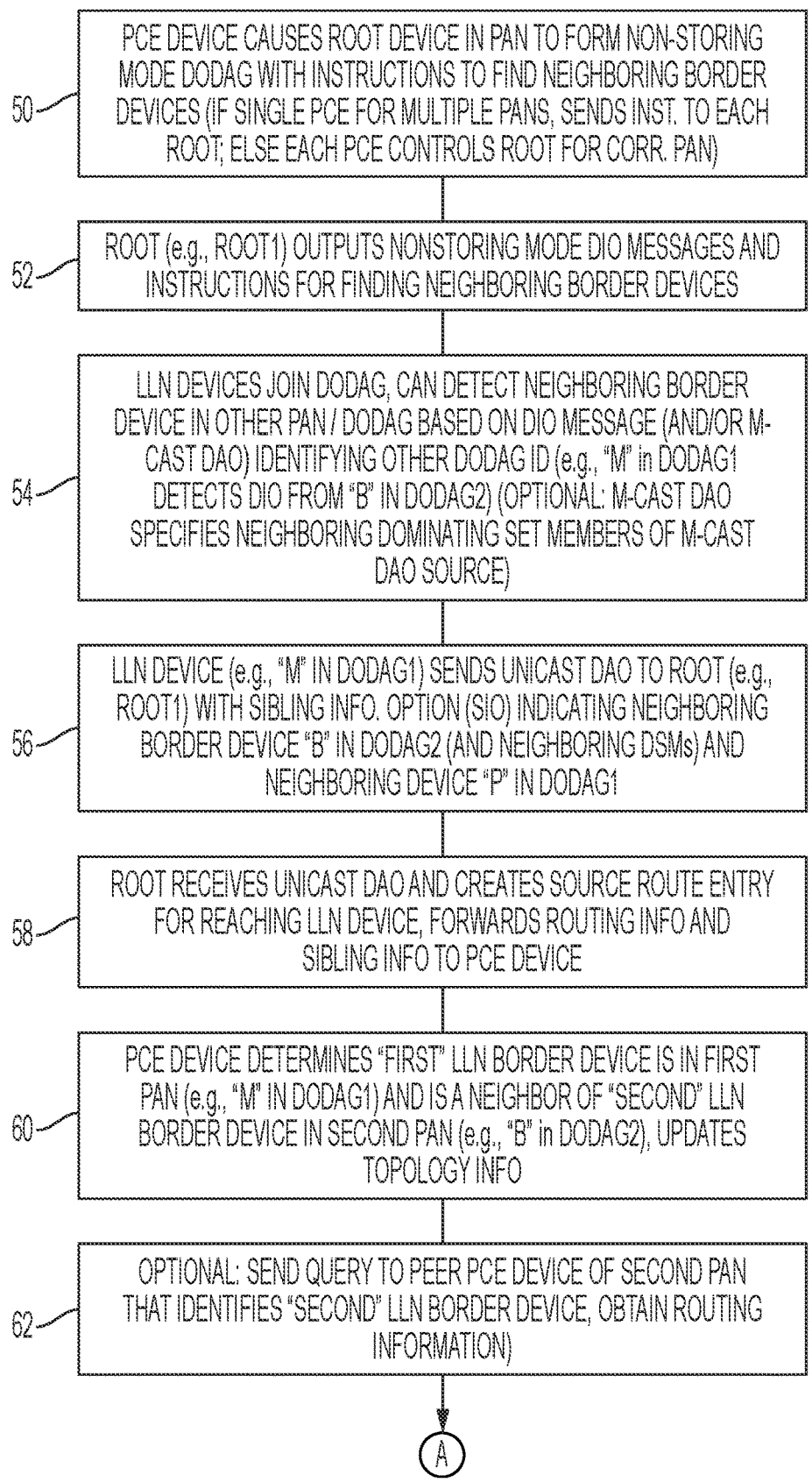
FIGS. 3A-3B illustrate an example method of generating an inter-PAN path for deployment across neighboring LLN border devices that are deployed within respective personal area networks (PANs), according to an example embodiment.
Figure 3B:
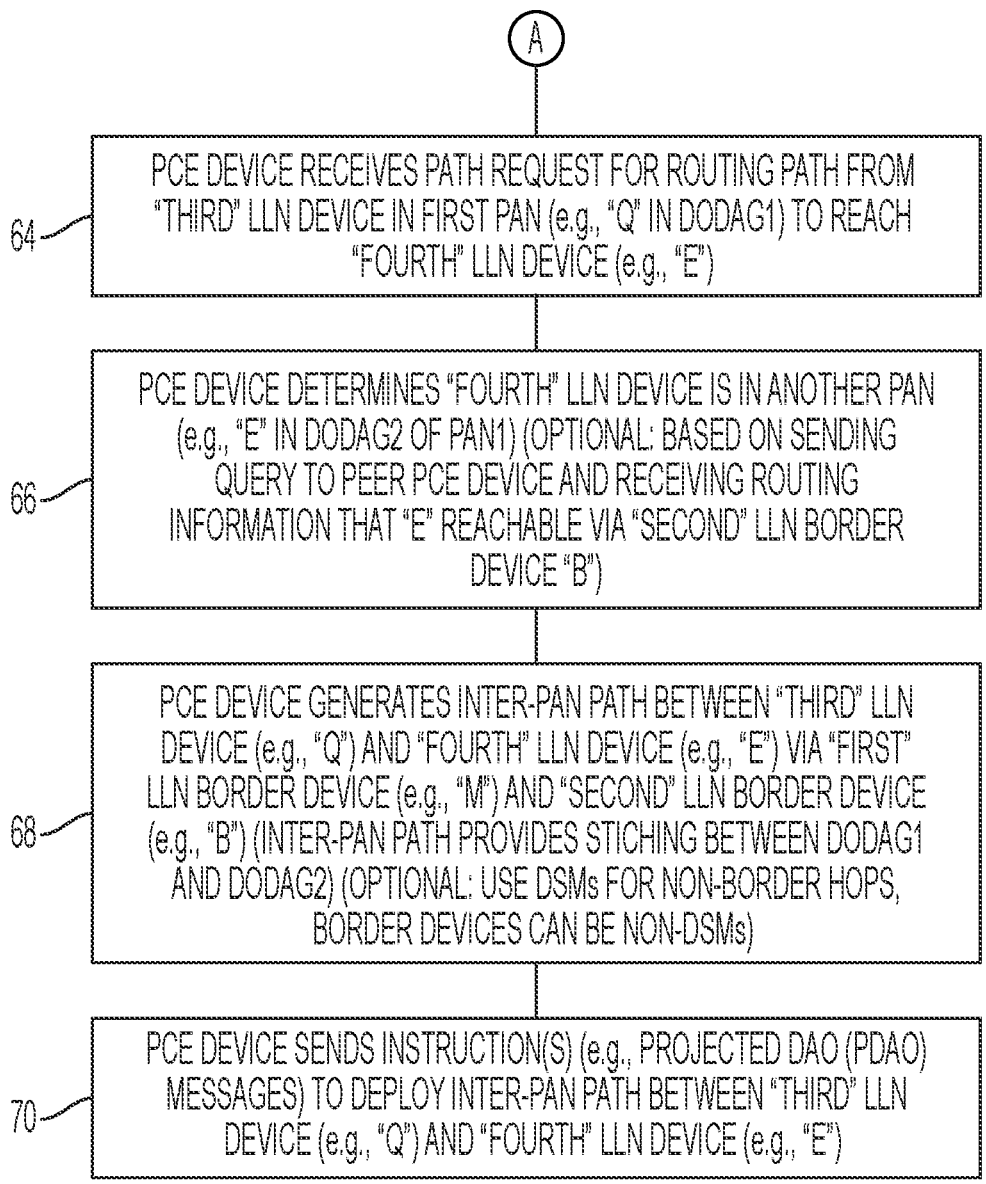

FIGS. 3A-3B illustrate an example method of generating an inter-PAN path for deployment across neighboring LLN border devices that are deployed within respective personal area networks (PANs), according to an example embodiment.

Figure 4A:
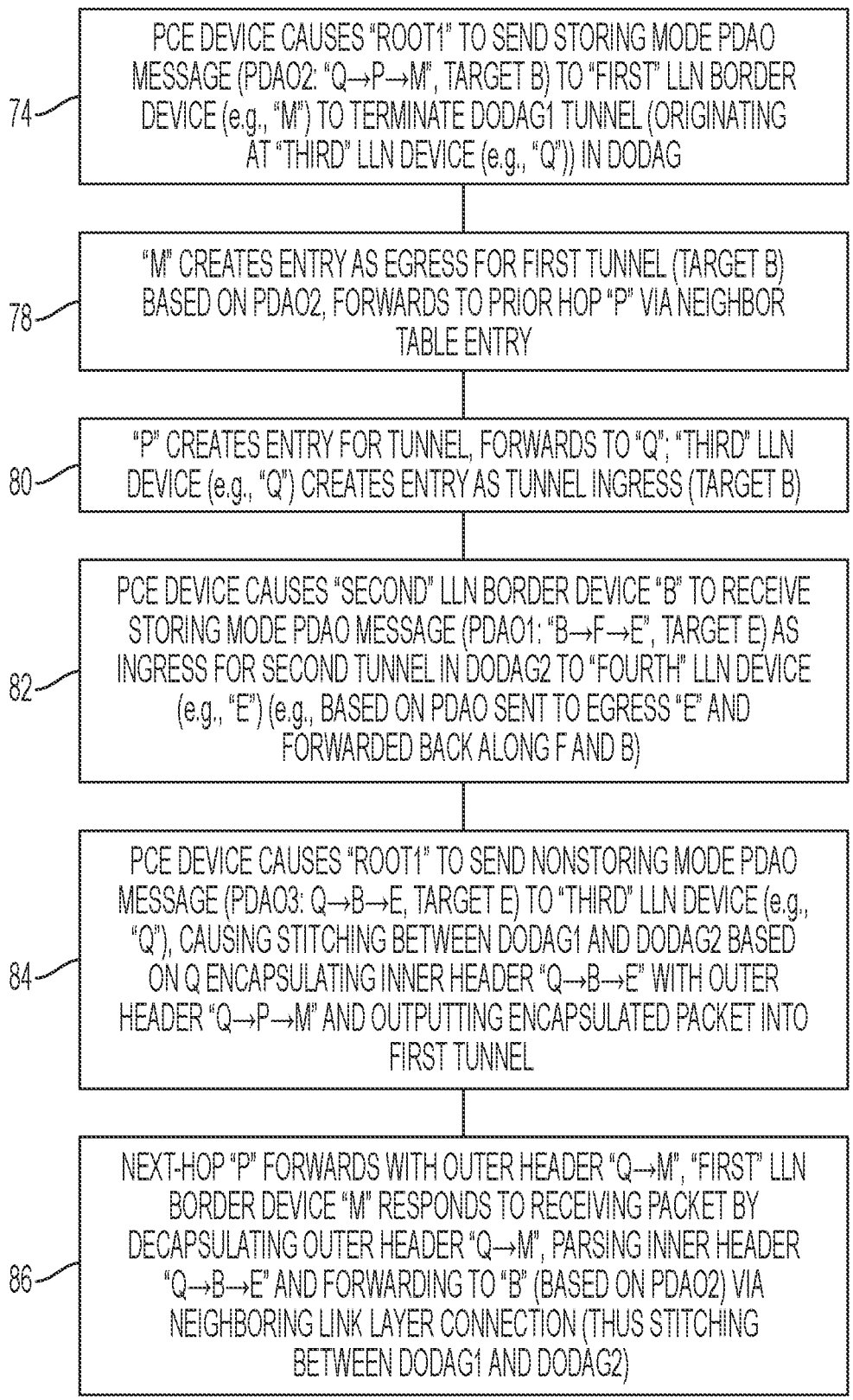
FIGS. 4A-4B illustrate example methods for causing the inter-PAN path to be deployed based on stitched segments according to a storing mode, stitched segments according to a nonstoring mode, or stitched tracks according to a nonstoring mode, according to an example embodiment.
Figure 4B:
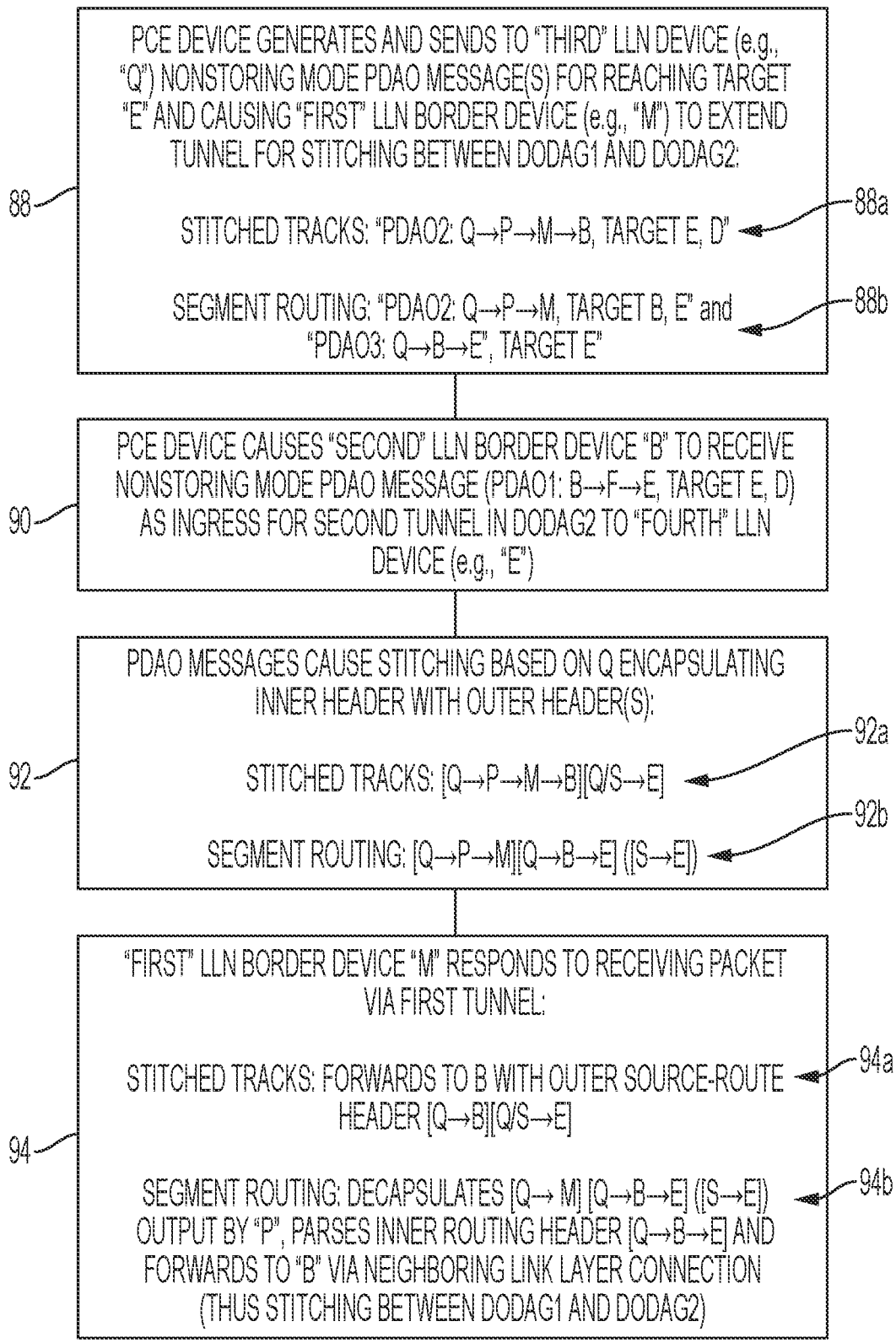

FIGS. 4A-4B illustrate example methods for causing the inter-PAN path to be deployed based on stitched segments according to a storing mode, stitched segments according to a nonstoring mode, or stitched tracks according to a non-storing mode, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3A, the processor circuit 42 of the PCE controller device 12 in operation 50 can cause its associated root network device(s) 18 in its associated PAN(s) 16 to form a non-storing mode DODAG 20, for example according to the IETF RFC 6550, modified as described herein. If a single PCE controller device 12 is configured for controlling multiple PANs such as the first PAN 16a and the second PAN 16b of FIG. 1, the PCE controller device 12 can send instructions to each of the root network devices 18a and 18b for initiating formation of the corresponding DAG topology 20 and 20b; alternatively, if as illustrated in FIG. 6 an LLN 10' comprises multiple PCE controller devices 12a, 12b, 12c controlling respective PANs 16a, 16b, and 16c, then each PCE device 12 in operation 50 can send instructions its corresponding root network device 18 for generation of a corresponding DAG topology 20. The following description will describe use of a single PCE (as in FIG. 1), with the understanding that the following description also is applicable to a multiple-PCE deployment as in FIG. 6.

The PCE controller device 12 in operation 50 also can send instructions to each root network device 18 requesting that each wireless LAN device 22 attempt to locate neighboring border devices, described below. Hence, each root network device "Root1" 18a, 18b in operation 52 can output a nonstoring mode DIO message (according to RFC 6550) for establishment of a corresponding source DAG topology 20a, 20b: the DIO message can specify a DODAG identifier that uniquely identifies the DAG topology 20 being formed, for example the root network device "Root1" 18a can output a DIO message specifying a DODAG identifier value of "DODAGID=2000::000A" (hexadecimal), whereas the root network device "Root1" 18a can output a DIO message specifying a DODAG identifier value of "DODAGID=2000::000B"; hence, the DIO message also can specify instructions for each wireless LAN device 22 to attempt finding any neighboring border devices, for example based on detecting a DIO message specifying a different DODAG identifier.

Hence, each of the wireless LAN devices 22 in operation 54 can join a DAG topology 20 according to RFC 6550: a "child" wireless LLN device 22 detecting a DIO output by a root network device 18 (e.g., "H", "J" detecting the DIO of the root network device "Root1" 18a in the first PAN 16a; "C", "G" detecting the DIO of the root network device "Root2" 18b in the second PAN 16b) can select a DAG root 18 as a parent in the identified nonstoring DODAG topology 20 based on comparing network topology metrics (advertised in the DIO) to a prescribed objective function specified in the DIO for the RPL instance. The "child" network device, upon attaching to its parent, can output its own DIO with updated network topology metrics that enable other wireless LLN devices 22 to discover the identified nonstoring DODAG topology 20, learn the updated network topology metrics, and select a DODAG parent based on the objective function specified in the DIO for attachment to the identified nonstoring DODAG topology 20.

Hence, propagation of updated DIO messages, for example according to RFC 6550, can result in the nonstoring DODAG topologies 20a and 20b illustrated in FIG. 1. The nonstoring DODAG topologies 20a and 20b result in the wireless LLN devices 22 not storing any routing information, except for identifying parent network devices as next-hop parents in order to establish a default route for reaching its the root network device 18; the non-storing mode enables memory savings in intermediate nodes in between the root network device 18 and "leaf" network devices (e.g., "A", "D", "O", and "S") in the various nonstoring DODAG topologies 20a and 20b, and is particularly suited to P2MP and MP2P traffic.

Figure 6:
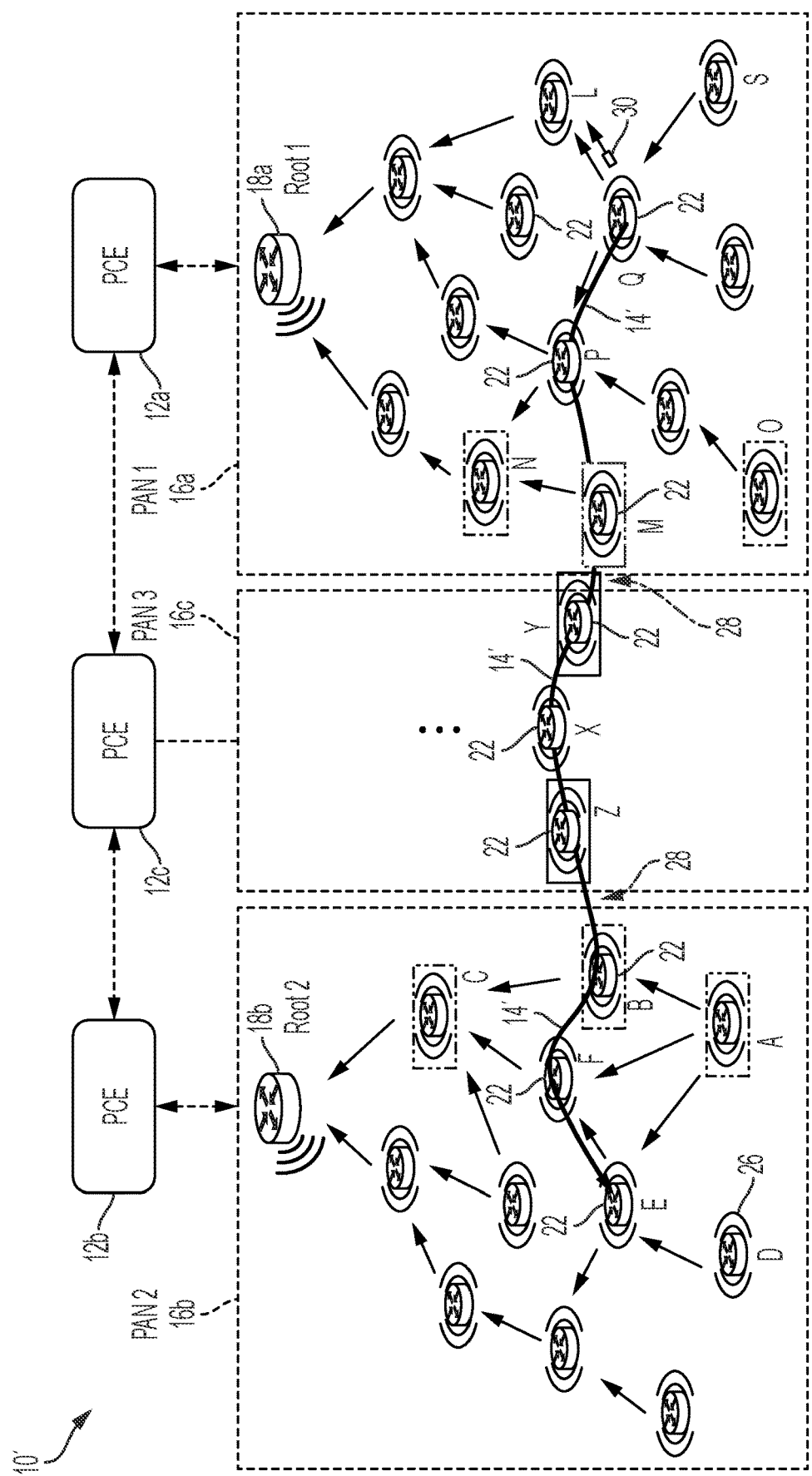
FIG. 6 illustrates an example inter-PAN path deployed across a source PAN, an intermediate PAN, and a destination PAN, according to an example embodiment.

As illustrated in FIGS. 1 and 6, the wireless LLN devices "H", "J", "K", "L", "M", "N", "O", "P", "Q", "S" 22 (and others) are illustrated as joining in operation 54 the source DAG topology 20a having the DODAG identifier value of "DODAGID=2000::000A", whereas the wireless LLN devices "A", "B", "C", "D", "E", "F", "G" 22 (and others) are illustrated as joining in operation 54 the destination DAG topology 20b having the DODAG identifier value of "DODAGID=2000::000B".

Each wireless LAN device 22 in operation 54 also can detect neighboring border devices 22 in another DAG topology 20 of another PAN 16, based on detecting a different DODAG identifier value than the corresponding DODAG identifier value of the DAG topology 20 to which the wireless LAN device 22 is attached. For example, the wireless LLN device "M" 22 belongs to the source DAG topology 20a having the DODAG identifier value of "DODAGID=2000::000A": the wireless LLN device "M" 22 can detect a DIO message transmitted by the wireless LLN device "B" 22 via a neighboring link layer connection 28. The wireless LLN device "M" 22 can detect that the DIO message transmitted by the wireless LLN device "B" 22 specifies a different DODAG identifier value of "DODAGID=2000::000B"; hence, the wireless LLN device "M" 22 of the DAG topology 20a can determine the wireless LLN device "B" 22 is a neighboring border device for the DAG topology 20b. Similarly, the wireless LLN device "N" 22 of the DAG topology 20a can determine that the wireless LLN device "C" 22 is a neighboring border device for the DAG topology 20b, and the wireless LLN device "O" 22 of the DAG topology 20a can determine that the wireless LLN device "A" 22 is a neighboring border device for the DAG topology 20b. The border devices are illustrated in FIGS. 1 and 6 as having surrounding rectangles.

Each of the wireless LLN devices 22 in the nonstoring DODAG topology 20a or 20b can generate and unicast output to its root network device 18a or 18b in operation 56 a Destination Advertisement Object (DAO) message, enabling the root network device 18 and/or the PCE 12 to identify the nonstoring DODAG topology 20, including an identification of essential parents, non-essential parents, and leaf nodes for identification of a set of dominating set members in the DAG topology 20. Hence, each wireless LLN device (e.g., "M") 22 in operation 56 can unicast transmit to its root network device (e.g., "Root1") 18 a DAO message according to RFC 6550: the wireless LLN device (e.g., "M") 22 also can specify a sibling information option (SIO) that indicates a neighboring border device in another DAG topology 20 of another PAN 16; hence, the wireless LLN device "M" 22 can unicast transmit to its root network device "Root1" 18a a DIO message specifying it is a "child" of the wireless LLN device "N" 22, and that it has a neighboring border device "B" 22 that is within a different DAG topology 20 having a different DODAG identifier value of "DODAGID=2000::000B".

An optional variation in operations 54 and 56 is that each wireless LAN device 22 can identify one or more neighboring border devices from detecting a multicast destination advertisement object (DAO) ("m-cast DAO") message that specifies one or more neighboring dominating set members. In particular, the root network device 18 and/or the root network device 18 can identify, for each DAG topology 20, essential parent devices as part of an initial dominating set based on excluding redundant parents in the associated nonstoring DODAG topology 20: as illustrated in FIG. 1, the processor circuit 42 of the root network device 18 and/or the PCE controller device 12 can reduce dominating set membership based on excluding the redundant parent devices "K" and "L" in the source DAG topology 20a (and "B" and "F" in the destination DAG topology 20b) from consideration for membership in an initial dominating set; any leaf network device that does not have any attached child network device also is excluded from consideration for membership in the initial dominating set.

Hence, the processor circuit 42 of the root network device 18 and/or the PCE controller device 12 identifies the first essential parent devices in the initial dominating set that provide the only path for another network device to reach the root 18 of the corresponding nonstoring DODAG topology 20, and stores the initial dominating set within a data structure of its memory circuit 44. The processor circuit 42 of the root network device 18 and/or the PCE controller device 12 also can store the list of leaf network devices for the associated DAG topology 20. If necessary, the root network device 18 and/or the PCE controller device 12 can identify, from among the excluded network devices, any "orphan" network device that does is not attached to any parent device within the initial dominating set, and in response selectively add a previously-excluded redundant parent device as belonging to the final dominating set based on the one redundant parent device providing a necessary path for the identified orphan network device to reach at least one of the first essential parent devices. The PCE controller device 12 can cause the root network device 18 to output either a corresponding membership message (indicating membership as a dominating set member (DSM)) or a corresponding non-membership message (indicating non-membership in the set of DSMs) to each wireless LLN device 22 in the corresponding DAG topology 20. Hence, the wireless LAN device 22 (e.g., "B") can receive a non-membership message indicating it is not a dominating set member in the DAG topology 20*b*.

In response to receiving a membership message, a dominating set member can multicast a dominating set member advertisement message specifying its membership in the final dominating set for the DAG topology 20 (e.g., by a corresponding membership identifier), enabling neighboring network devices to detect the membership of the corresponding dominating set member. The dominating set member advertisement message can be part of, or distinct from, a multicast advertisement message generated and transmitted by the dominating set member. Hence, each wireless LAN device 22 in operation 54 can respond to the multicasting of each dominating set member advertisement message (and/or multicast advertisement message) by storing in its neighbor table in its memory circuit 44 that the corresponding dominating set member is directly reachable.

Hence, a wireless LAN device 22 (e.g., "B") can transmit a corresponding multicast advertisement message (e.g., a multicast DAO) specifying that it is a non-dominating set member that can reach the identified dominating set members in its DAG topology 20*b* (identified by the DODAG identifier value of "DODAGID=2000::000B"), according to Section 9.10 of RFC 6550 and modified as described herein to identify dominating set members that are reachable by a wireless LAN device 22. Further details regarding identification of dominating set members, and advertising reachability to dominating set members, are described in U.S. Pat. No. 10,749,786 assigned to Cisco Technology, Inc.

Hence, a wireless LAN device (e.g., "M") 22 in operation 56 can unicast transmit to its root network device 18 a DAO message specifying not only the SIO indicating a neighboring border device (e.g., "B") of a second DAG topology 20*b* in a different PAN (e.g., "PAN2") 16*b*, but also whether the border device is a dominating set member in the second DAG topology or a non-dominating set member that can reach other dominating set members in the second DAG topology. In this example, the DAO message output by the wireless LAN device (e.g., "M") 22 in operation 56 can specify that the neighboring border device (e.g., "B") of the destination DAG topology 20*b* (identified by the DODAG identifier value of "DODAGID=2000::000B") is not a dominating set member in the destination DAG topology 20*b*.

The root network device 18 in operation 58 can receive the unicast DAO from each wireless LAN device 22 in its DAG topology 20, and in response can create a source-route entry for reaching the wireless LAN device 22 having transmitted the unicast DAO message. The root network device 18 can forward in operation 58 the routing information (for reaching the wireless LAN device 22) and the sibling information (identifying the neighboring border device) to the PCE controller device 12.

The processor circuit 42 of the PCE controller device 12 in operation 60 can determine that the wireless LLN device "M" 22 is a "first" LLN border device in the DAG topology 20*a* of the first PAN 16*a*, and that the wireless LLN device "M" 22 is a neighbor of the "second" LLN border device "B" that is deployed in the DAG topology 20*b* of the second PAN 16*b*, and update its topology information related to the wireless LLN device "M" 22 in the DAG topology 20*a*. If the PCE controller device 12 also is configured for controlling the second PAN 16*b*, the PCE controller device 12 also can update its entry for the wireless LLN device "B" 22 in the DAG topology 20*b* to indicate that the wireless LLN device "B" 22 is a neighbor of the "first" LLN border device "M" that is deployed in the DAG topology 20*a*. As apparent from the foregoing, the processor circuit 42 of the PCE controller device 12 in operation 62 can determine the neighboring border LLN border device "A" in the DAG topology 20*b* based on a corresponding DAO message from the wireless LLN device "O" 22 in the DAG topology 20*a*; the PCE controller device 12 in operation 62 also can determine the neighboring border LLN border device "C" in the DAG topology 20*b* based on a corresponding DAO message from the wireless LLN device "N" 22 in the DAG topology 20*a*.

Hence, the processor circuit 42 of the PCE controller device 12 of FIG. 1 (or the PCE controller device 12*a* of FIG. 6) can determine the topology of its DAG topology 20*a* based on received DAO messages from each of the wireless LAN devices 22 in the DAG topology 20*a*, including identification of the border LLN devices "A", "B", and "C" in the DAG topology 20*b* that are reachable via the border LLN devices "O", "M", and "N", respectively, in the DAG topology 20*a*.

The processor circuit 42 of the PCE controller device 12 of FIG. 1 also can determine the topology of the DAG topology 20*b* based on received DAO messages from each of the wireless LAN devices 22 in the DAG topology 20*b*; alternately, the PCE controller device 12 in operation 62 can send a query to a peer PCE device, for example the PCE device 12*a* sending a query to the PCE controller device 12*b* in FIG. 6 in order to obtain routing information for reaching the wireless LLN border device "B" 22 in the DAG topology 20*b* (and possibly dominating set members that are neighbors of the wireless LLN device "B" 22).

Referring to FIG. 3B, the processor circuit 42 of the PCE controller device 12 in operation 64 can receive a path request message, also referred to as a PDAO request (PDR) message 30, that specifies a routing path from a "third" LLN device (e.g., "Q") 22 to a "fourth" LLN device (e.g., "E"), for example for an identified data flow between the RPL-enabled wireless LLN devices "Q" and "E" 22 and that is identified by a data packet specifying a source address for the wireless LLN device "Q" 22 and a destination address for the wireless LLN device "E" 22 (e.g., the source-destination address pair illustrated by the expression "Q→E"); the routing path also can be for non-RPL enabled devices "S" 22 and "D" 22 attached to the "third" and "fourth" RPL-enabled wireless LLN devices "Q" and "E", respectively (e.g., the source-destination address pair illustrated by the expression "S→D"). The path request (PDR) message 30 can be initiated by the source of a data flow (e.g., wireless LLN devices "S" or "Q"), an ingress tunnel for the routing path (e.g., "Q"), the destination of the data flow (e.g., wireless LLN devices "D" or "E"), or an egress tunnel for the routing path (e.g., "E").

The processor circuit 42 of the PCE controller device 12 in operation 66 can determine that the "fourth" LLN device (identified as the egress or destination of the routing path from the "third" LLN device) is in a different DAG topology 20b, for example the destination DAG topology 20b in the second PAN 16b: the PCE controller device 12 can identify the different destination DAG topology 20b from its locally-available routing tables (based on received DAO messages from the wireless LAN devices 22 in the destination DAG topology 20b) if it controls both source and destination PANs 16a and 16b, as illustrated in FIG. 1. Alternately, as illustrated in FIG. 6, the processor circuit 42 of the PCE controller device 12a in operation 66 can send a query to a peer PCE controller device 12 (e.g., 12c) requesting whether the "fourth" LLN device is reachable via its associated PAN 16 (e.g., 16c), which can cause the peer PCE controller device 12c to forward the query to the next peer PCE controller device 12b; the PCE controller device 12b can respond with a reply to the PCE controller device 12c that the "fourth" LLN device "E" in the second PAN 16b is reachable via the LLN border device "B" in the second PAN 16b and its neighboring LLN border device "Z" in the PAN 16c, causing the PCE controller device 12c to respond with a reply to the PCE controller device 12a that the "fourth" LLN device "E" in the second PAN 16b is reachable via the LLN border device "Y" in the PAN 16c and its neighboring LLN border device "M" in the first PAN 16a.

Hence, the processor circuit 42 of the PCE controller device 12 in FIG. 1 (or 12a of FIG. 6) in operation 68 can generate an inter-PAN path 14 (in FIG. 1) or 14' (in FIG. 6) between the "third" LLN device "Q" 22 and the "fourth" LLN device "E" 22 via the first LLN border device "M" 22 in the source DAG topology 20a of the source first PAN 16a and the second LLN border device "B" in the destination DAG topology 20b of the destination second PAN 16b. As illustrated in FIG. 1, the processor circuit 42 of the PCE controller device 12 can generate in operation 68 the inter-PAN path 14 comprising the hop-by-hop sequence of LLN devices "Q→P→M→B→F→E" via the neighboring link layer connection 28 between the neighboring first and second border devices "M" and "B". As illustrated in FIG. 6, the processor circuit 42 of the PCE controller device 12a can cooperate with the PCE devices 12b and 12c to generate in operation 68 the inter-PAN path 14' comprising the hop-by-hop sequence of LLN devices "Q→P→M→Y→X→Z→B→F→E" via the neighboring link layer connection 28 between the neighboring first and fifth border devices "M" and "Y", and the neighboring link layer connection 28 between the neighboring sixth and second border devices "Z" and "B" 22.

The inter-PAN path 14 (or 14') can include a selected sequence of dominating set members within each DAG topology 20, with the exception none of the border devices (e.g., "M", "Y", "Z", or "B") need be dominating set members; hence, the inter-PAN path 14 (or 14') can include two non-dominating set members as border relays along the inter-PAN path 14 (or 14').

The processor circuit 42 of the PCE controller device 12 (or 12a of FIG. 6) in operation 70 can send one or more instructions (e.g., projected DAO messages) for deployment of the inter-PAN path 14 (or 14') between the third LLN device "Q" in the source DAG topology 20a of the first PAN 16a and the fourth LLN device "E" in the destination DAG topology 20b of the second PAN 16b.

As described below, the processor circuit 42 of the PCE controller device 12 in operation 70 can generate and transmit to selected wireless LAN devices 22 in each PAN 16 of the inter-PAN path 14 (or 14') one or more projected DAO (PDAO) messages (72 of FIGS. 5A and 5B) for deployment of the inter-PAN path 14 or 14'. Further, the inter-PAN path 14 (or 14') can be deployed according to various deployment protocols described below, for example as stitched segments according to a storing mode or non-storing mode, or as stitched tracks according to a nonstoring mode.

FIGS. 4A-4B illustrate example methods for causing the inter-PAN path to be deployed based on stitched segments according to a storing mode, stitched segments according to a nonstoring mode, or stitched tracks according to a non-storing mode, according to an example embodiment. Any of the operations described below can be executed by any one of the PCE controller device 12 of FIG. 1, or any one or more of the PCE controller device 12a, 12b, and/or 12c of FIG. 6 operating in cooperation for exchange of routing information and PDAO installation instructions. The following operations will be described with respect to the PCE controller device 12 of FIG. 1, with the understanding that the operations can be shared among the PCE controller device 12a, 12b, and/or 12c of FIG. 6, as appropriate.

Figure 5A:
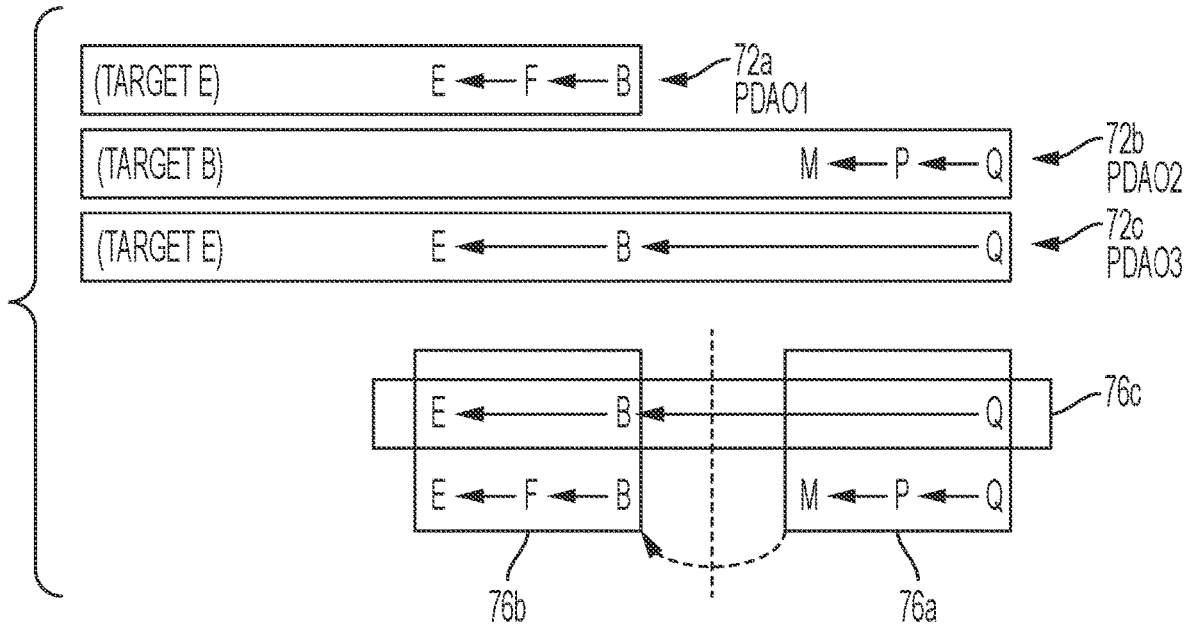
FIGS. 5A and 5B illustrate example deployments of the inter-PAN path based on a tunnel in a first PAN having a tunnel egress in the first PAN or a second PAN, respectively, according to an example embodiment.
Figure 5B:
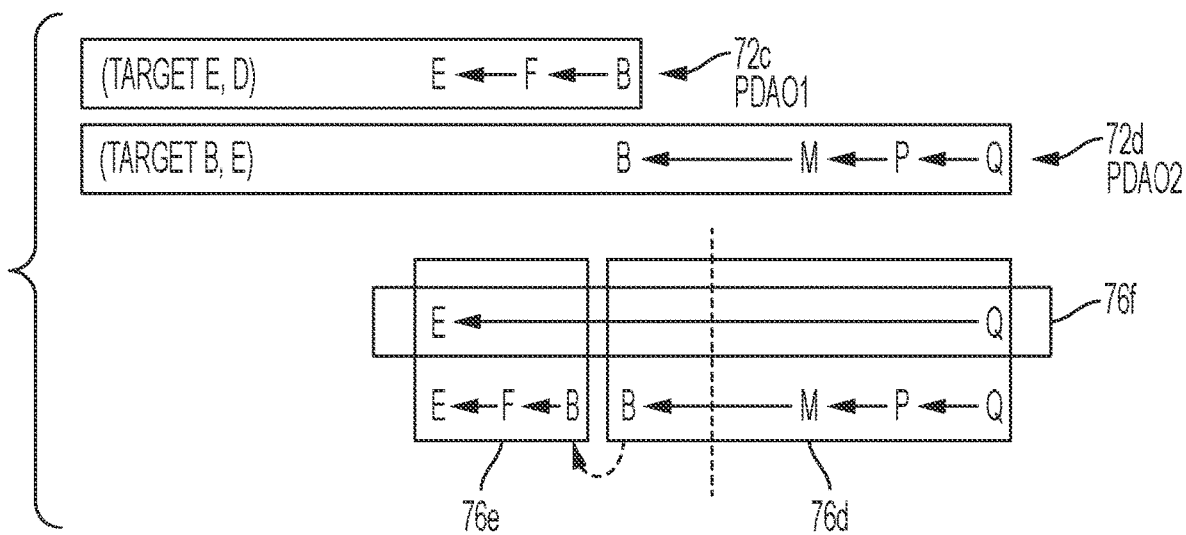

FIGS. 5A and 5B illustrate example deployments of the inter-PAN path based on a tunnel in a first PAN having a tunnel egress in the first PAN or a second PAN, respectively, according to an example embodiment.

In particular, FIG. 4A illustrates an example implementation of the inter-PAN path 14 in operation 70 of FIG. 3B according to a storing mode stitching in segment routing, according to an example embodiment. Referring to FIG. 1, FIG. 4A, and FIG. 5A the processor circuit 42 of the PCE controller device 12 in operation 74 can cause implementation of the inter-PAN path 14 (or 14') based on causing the root network device "Root1" 18a to send a PDAO message "PDAO2" 72b (implemented in storing mode) to the "first" LLN border device "M" 22. As described in further detail, the PDAO message 72 is a modification (as described herein) of the PDAO message described in the IETF Internet Draft by Thubert et al, "Root initiated routing state in RPL", ("draft-ietf-roll-dao-projection-09"). A Storing-Mode P-DAO contains a Storing Mode Via Information Option (SF-VIO) field that signals a strict sequence of consecutive nodes to form a segment between a segment ingress and a segment egress (both included in the storing mode PDAO). The storing mode PDAO causes installation of a route of a higher precedence (than default routes) in each wireless LLN device 22 along the segment towards the Targets indicated in the Target Options. The segment is included in a DODAG indicated by the P-DAO Base Object, that may be the one formed by the main RPL Instance, or a Track associated with a local RPL Instance. A Track Egress is signaled as a Target in the P-DAO, and as the last entry is an SF-VIO of a last segment towards that Egress. The storing-mode P-DAO is propagated along the chain of Via devices from the egress device of the path until reaching the ingress device, which can confirm the installation to the Root with a DAO-ACK message.

Hence, the PDAO message "PDAO2" 72b sent in operation 74 to the "first" LLN border device "M" 22 specifies the "root" of the tunnel "Q→P→M" 76a being the third network device "Q" (Root=Q), a Via Information Option specifying the tunnel "Q→P→M" 76a in the source DAG topology 20a (VIO=Q, P, M) and a Track identifier "Track ID 129" from LLN device Q's Namespace, and a target identifier "Target B" indicating the second LLN border device "B" is the target for traffic sent along the tunnel "Q→P→M" 76*a*. Although not shown in FIG. 5A, the PDAO 72*b* message sent in operation 74 also is specified as a storing mode PDAO message; hence, the second LLN border device "M" in operation 78 can store the routing information from the PDAO message "PDAO2" 72*b*, and forward the PDAO message "PDAO2" 72*b* to its predecessor wireless LLN device "P" via a neighbor table entry obtained from a neighbor advertisement message from "P"; the wireless LLN device "P" in operation 80 can store the routing information from the PDAO message "PDAO2" 72*b* (in storing mode), and forward the PDAO message 72*b* to its predecessor wireless LLN device "Q".

Hence, the forwarding of the PDAO message "PDAO2" 72*b* (in storing mode) from network devices "M" to "P" to "Q" causes the third LLN device "Q" 22 in operation 80 to store a routing table entry (for target "B") that causes generation by "Q" of a source routing header for a first tunnel 76*a* that originates and ends in the source DAG topology 20*a*, as illustrated in FIG. 5A: the target identifier "Target B" enables the first LLN border device "M" as the tunnel egress to identify that the next-hop destination is the neighboring second LLN border device "B" 22 that is reachable via the neighboring link layer connection 28. Hence, the PDAO message "PDAO2" 72*b* causes creation of the tunnel "Q→P→M" 76*a* that enables stitching between the source DAG topology 20*a* and the destination DAG topology 20*b* (based on a third tunnel 76*c* created by a third PDAO message "PDAO3" 72*c*, described below).

Regarding the destination DAG topology 20*b*, the processor circuit 42 of the PCE controller device 12 in operation 82 can cause implementation of the inter-PAN path 14 (or 14') based on causing the root network device "Root2" 18*b* to send a PDAO message "PDAO1" 72*a* to the "fourth" network device "E" specifying the "root" of a tunnel "B→F→E" 76*b* being the third network device "Q" (Root=Q), a Via Information Option specifying the tunnel "B→F→E" 76*b* in the destination DAG topology 20*b* (VIO=B, F, E) and a Track identifier "Track ID 129" from LLN device Q's Namespace, and a target identifier "Target E" indicating the fourth network device "E" is the target for traffic sent along the tunnel "B→F→E" 76*b*. Although not shown in FIG. 5A, the PDAO message 72*a* sent in operation 82 also is specified as a storing mode PDAO message; hence, the "fourth" network device "E" can store the routing information from the PDAO message "PDAO1" 72*a*, and forward the PDAO message "PDAO1" 72*a* to its predecessor wireless LLN device "F" as specified in the PDAO message "PDAO1" 72*a*; the wireless LLN device "F" can store the routing information from the PDAO message "PDAO1" 72*a* (in storing mode), and forward the PDAO message 72*a* to its predecessor wireless LLN device "B" as specified in the PDAO message 72.

Hence, the forwarding of the PDAO message "PDAO1" 72*a* (in storing mode) from network devices "E" to "F" to "B" causes the second LLN border device "B" 22 to store a routing table entry for generation of a source routing header for generation of a second tunnel 76*b* that originates and ends in the destination DAG topology 20*b*, as illustrated in FIG. 5A.

The processor circuit 42 of the PCE controller device 12 in operation 84 can complete implementation of the inter-PAN path 14 (or 14') based on causing the root network device "Root1" 18*a* to send a nonstoring mode PDAO message "PDAO3" 72*c* to the "third" LLN border device "Q" 22 specifying the "root" of a tunnel "Q→B→E" 76*c* being the third network device "Q" (Root=Q), a Via Information Option specifying the tunnel "Q→B→E" 76*c* that stitches together the source DAG topology 20*a* and the destination DAG topology 20*b* (SRVIO=B, F) and a Track identifier "Track ID 129" from LLN device Q's Namespace, and a target identifier "Target E" indicating the fourth LLN border device "E" is the target for traffic sent along the tunnel "Q→B→E" 76*c*.

Hence, the third network device "Q" 22 can generate a packet with header "Source=Q, Dest.=B, Source Route header E" (for implementation of the loose source-routed tunnel "Q→B→E" 76*c*); if the third network device "Q" forwards a packet received from the wireless LLN device "S" specifying the source-destination path "S→E" (or "S→E→D"), then that packet is encapsulated by the third network device "Q" 22 with the source-route header for transmission of the encapsulated packet "[Q→B→ E] [S→E]" along the tunnel "Q→B→E" 76*c*.

The third network device "Q" 22 also identifies a path to target "B" (identified as the next hop in the tunnel "Q→B→E" 76*c*) via its next hop "P" based on the PDAO message "PDAO2" 72*b*, and therefore encapsulates the packet [Q→B→ E] ([S→E]) into the source route header "Q→ P→ M" for transmission of the encapsulated packet [Q→P→ M] [Q→B→ E] ([S→D]) via the tunnel "Q→P→M" 76*a* (the reference to "([S→E])" indicates an optional encapsulation for a packet from the wireless LLN device "S" 22, as opposed to a packet originated by the third network device "Q" 22). Hence, the encapsulation of "[Q→B→ E] ([S→E])" with the outer header "[Q→ P→ M]" enables the stitching between the source DAG topology 20*a* and the destination DAG topology 20*b* via the tunnel "Q→B→E" 76*c* and the tunnel "Q→P→M" 76*a* in operation 84.

The next-hop wireless LLN device "P" can receive the encapsulated packet "[Q→ P→ M] [Q→B→ E] ([S→E])" and forward based on the strict source routing header "[Q→ P→ M]", causing the next-hop wireless LLN device "P" to update the strict source routing header forward the encapsulated packet "[Q→ M] [Q→B→ E] ([S→E])" to the first LLN border device "M" 22 in operation 84.

The first LLN border device "M" 22 in operation 86 can respond to receiving the encapsulated packet "[Q→ M] [Q→B→ E] ([S→E])" as egress node that terminates the tunnel "Q→P→M" 76*a* by decapsulating the source routing header "[Q→ M]", and parsing the inner header "[Q→B→ E]": the first LLN border device "M" 22 can determine it has a neighbor entry for the second border LLN device "B" 22, and therefore can forward the packet "[Q→B→ E] ([S→E])" to the second LLN border device "B" 22 via the neighboring link layer connection 28. As apparent from the foregoing, the second LLN border device "B" 22 can respond to receiving the packet "[Q→B→ E] ([S→E])" by determining it has a path to the fourth LLN device "E" 22 via the tunnel "B→F→E" 76*b* (based on the previously-received PDAO message "PDAO1" 72*a*), enabling the second LLN border device "B" 22 to encapsulate the packet "[Q→ E] ([S→E])" with the strict source routing header "[B→F→ E]", resulting in transmission of the encapsulated packet "[B→F→ E] [Q→ E] ([S→E])" for transmission to the fourth LLN device "E" 22 via the tunnel "B→F→E" 76*b*.

The LLN device "F" can forward the encapsulated packet "[B→E] [Q→E] ([S→E])" to the "fourth" LLN device "E" 22. The "fourth" LLN device "E" 22 can remove the routing headers "[B→E] [Q→E]": if the packet is an encapsulated packet destined for "D", i.e., "S→D", then the network device "E" forwards to the network device "D"; if the destination is "E", the network device "E" decapsulates and passes the protocol data unit (PDU) up the stack for internal processing.

FIG. 4B illustrates another example implementation of the inter-PAN path 14 in operation 70 of FIG. 3B using nonstoring mode PDAO messages 72 for deployment of the inter-PAN path 14 according to one of stitched tracks or stitched segments according to segment routing, according to an example embodiment. The PCE controller device 12 in operation 88 can generate and send to the "third" LLN device "Q" 22 a nonstoring mode PDAO message for reaching the target "fourth" LLN device "E" 22 and causing the "first" LLN border device "M" 22 to extend a tunnel for stitching between the source DAG topology 20a and the destination DAG topology 20b.

For example, the processor circuit 42 of the PCE controller device 12 in operation 88a can implement the inter-PAN path 14 using nonstoring mode stitched tracks based on causing instructions in the form of a nonstoring mode PDAO "PDAO2" 72d to be sent to the "third" LLN device "Q" 22. In particular, the nonstoring mode PDAO message "PDAO2" 72d sent to the "third" LLN device "Q" 22 in operation 88a specifies the "root" of the tunnel "Q→P→M→B" 76d being the "third" LLN device "Q" 22 (Root=Q), a Via Information Option specifying a tunnel "Q→P→M→B" 76d in the source DAG topology 20a (VIO=Q, P, M, B) and a Track identifier "Track ID 129" from LLN device Q's Namespace, and a target identifier "Target B, E" indicating the "second" LLN border device "B" 22 or the "fourth" LLN device "E" 22 as targets for traffic sent along the tunnel "Q→P→M→B" 76d of FIG. 5B. As illustrated in FIG. 5B, the tunnel "Q→P→M→B" 76d stitches the source DAG topology 20a and the destination DAG topology 20b based on extending the tunnel "Q→P→M→B" 76d from the "first" LLN border device "M" 22 in the source DAG topology 20a to the "second" LLN border device "B" 22 in the destination DAG topology 20b via the neighboring link layer connection 28.

The processor circuit 42 of the PCE controller device 12 in operation 90 can further implement the inter-PAN path 14 based on causing the "second" LLN border device "B" 22 to receive (e.g., via the root network device "Root2" 18b) a nonstoring mode PDAO message "PDAO1" 72e that specifies the "root" of the tunnel "B→F→E" 76e being the "second" LLN border device "B" 22 (Root=B), a Via Information Option specifying a nonstoring mode tunnel "B→F→E" 76e in the destination DAG topology 20b (VIO=F, E) and a Track identifier "Track ID 131" from LLN device B's Namespace, and a target identifier "Target E, D" indicating the "fourth" LLN device "E" 22 or the wireless LLN device "D" 22 as targets for traffic sent along the tunnel "B→F→E" 76e of FIG. 5B.

Hence, the PDAO messages 72d and 72e in operations 88a and 90 enable the PCE controller device 12 in operation 92 to cause stitching between the DAG topology 20 and the destination DAG topology 20b based on the "third" LLN device "Q" 22 encapsulating in operation 92a a locally-generated data packet (destined for the "fourth" LLN device "E" 22 using inner header "[Q→E]") or a received data packet (destined for the "fourth" LLN device "E" 22 via a tunnel "Q→E" 76f using inner header "[S→E]") with an outer header "[Q→P→M→B]", resulting in the "third" LLN device "Q" 22 inserting the encapsulated packet "[Q→P→M→B] [Q/S→E]" into the tunnel "Q→E" 76f via the tunnel "Q→P→M→B" 76d, e.g., inner header "Source=Q or S, Dest.=E", or "Q:S→E", outer header "Source=Q, Dest=P, SRH=M,B and RPI=129". The next hop wireless LLN device "P" 22 forwards with the outer header "Source=Q, Dest.=M, SRH=B, and RPI=129", resulting in the encapsulated packet "[Q→ M→B] [Q/S→E]".

The next hop "first" LLN border device "M" 22 in operation 94 responds to receiving the data packet via the tunnel "Q→P→M→B" 76d by updating in operation 94a the outer header and forwarding with the outer header "Source=Q, Dest.=B, SRH=[null], and RPI=129" the encapsulated packet "[Q→B] [Q/S→E]" via the neighboring link layer connection 28.

As apparent from the foregoing, the "second" LLN border device "B" 22 responds to receiving the encapsulated packet "[Q→B] [Q/S→E]" via the neighboring link layer connection 28 by decapsulating the outer header, detecting that it has a route to the destination "fourth" LLN device "E" 22 specified in the inner header based on the PDAO message "PDAO1" 72e, and encapsulates the packet "[Q/S→E]" with an outer routing header "Source=B, Dest.=F, SRH=E and RPI=131" for transmission of the encapsulated data packet "[B→F→E] [Q/S→E]" to the "fourth" LLN device "E" 22 via the tunnel "B→F→E" 76e. Hence, the next-hop device "F" can update the source route header and output the encapsulated data packet "[B→E] [Q/S→E]" to the "fourth" LLN device "E" 22, enabling the "fourth" LLN device "E" 22 to decapsulate and process locally the packet (including possibly forwarding an enclosed packet "[Q/S→D]" to the wireless LLN device "D" 22.

FIG. 4B also illustrates an example deployment using nonstoring mode PDAO messages 72 for deployment of the inter-PAN path 14 according to stitched segments according to segment routing. In particular, the PCE controller device 12 in operation 88b sends to the "third" LLN device "Q" 22 a PDAO message "PDAO2" 72b in nonstoring mode specifying the root of the tunnel "Q→P→M" 76a as "Root=Q", VIO=P, M, Track 129 from Q's Namespace, Target=B, E) indicating that nonstoring mode path "Q→P→M" 76a. The PCE controller device 12 in operation 90 sends to the "second" LLN border device "B" 22 the PDAO message "PDAO1" 72a specifying "Root=B, VIO=F, E, Track ID 131 from B's Namespace, Target E" indicating the tunnel segment "B→F→E" 76b. The PCE controller device 12 in operation 92b sends to the "third" LLN device "Q" 22 a PDAO message "PDAO3" 72c specifying "Root=Q, SRVIO=B, E, Track 141 from Q's Namespace, Target=E" indicting the tunnel segment "Q→B→E" 76e that stitches together the source DAG topology 20a and the destination DAG topology 20b.

Hence, based on the PDAO3 72c the "third" LLN device "Q" 22 can generate or encapsulate a data packet to the "fourth" LLN device "E" 22 with a source route header via RPI=141, using the tunnel "Q→B→E" 76c; as described previously a received packet from the wireless LLN device "E" [S→E] would be encapsulated as "[Q→B→E] ([S→E]). The "third" LLN device "Q" 22 also can recursively encapsulate, based on the PDAO2 72b a data packet with the outer header "Source=Q, Dest.=P, SRH=M, and RPI=129, Q→ P→M", resulting in transmission of the encapsulated packet "[Q→ P→M] [Q→B→E] ([S→E])[Q→E]" in the tunnel "Q→B→E" 76c via the tunnel "Q→P→M" 76a. As described previously, the next-hop wireless LLN device "P" can forward the packet "[Q→M] [Q→B→E] ([S→E]) [Q→E]" with the with outer header "Source=Q, Dest.=M, SRH=B, and RPI=129" via the tunnel "Q→P→M" 76a to the "first" LLN border device "M" 22.

The "first" LLN border device "M" 22 in operation 94b can terminate the tunnel "Q→P→M" 76a and decapsulate the received packet "[Q→M] [Q→B→E] ([S→E])[Q→E]" that was output by wireless LLN device "P", and forward the decapsulated packet "[Q→B→E] ([S→E])" to its peer border router "B" 22 via the neighboring link layer connection 28, thus stitching the source DAG topology 20a and the destination DAG topology 20b. The "second" LLN border device "B" 22 can consume the routing header to recover the inner routing header "[Q→E] ([S→E])", and in response encapsulate the packet (with inner header Source=Q, Dest.=E) using the PDAO1 72a to generate the outer header "Source=B, Dest.=F, SRH=E and RPI=131" for transmission of the encapsulated packet "[B→F→E] [Q→E] ([S→E])" on the tunnel "B→F→E" 76b to the next-hop LLN device "F" 22.

As described previously, the LLN device "F" can forward the encapsulated packet "[B→E] [Q→ E] ([S→E])" to the "fourth" LLN device "E" 22. The "fourth" LLN device "E" 22 can remove the routing headers "[B→E] [Q→E]": if the packet is an encapsulated packet destined for "D", i.e., "S→D", then the network device "E" forwards to the network device "D"; if the destination is "E", the network device "E" decapsulates and passes the protocol data unit (PDU) up the stack for internal processing.

According to example embodiments, an inter-PAN path can be established via a peer-to-peer link layer data connection between bordering LLN devices in different PANs, enabling the respective root devices of the different PANs to be bypassed. The inter-PAN path can be established dynamically in response to a request from any wireless LLN device in any one of the different PANs, for example for path optimization of an identified flow of data packets for a prescribed time interval, enabling the inter-PAN path to be discarded upon completed transmission of the identified flow of data packets. The inter-PAN path also can traverse multiple PANs based on the respective PCE controller devices cooperating by exchanging routing information and instructions for deployment of the inter-PAN path across the different PANs.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a controller device in a low power and lossy network (LLN), that a first LLN border device is in a first personal area network (PAN) having a first directed acyclic graph (DAG) topology in the LLN, and that the first LLN border device is a neighbor of a second LLN border device in a second PAN of the LLN, the second PAN having a second DAG topology;
   receiving, by the controller device, a path request for a third LLN device in the first PAN to reach a fourth LLN device;
   determining, by the controller device, that the fourth LLN device is in the second PAN;
   generating, by the controller device, an inter-PAN path between the third LLN device and the fourth LLN device via the first and second LLN border devices, the inter-PAN path providing a stitching between the first DAG topology and the second DAG topology; and
   causing, by the controller device, the inter-PAN path to be deployed between the third LLN device and the fourth LLN device.

2. The method of claim 1, wherein the causing includes sending an instruction for the first LLN border device to execute at least one of:
   extend a first tunnel from the first LLN border device to the second LLN border device via a neighboring link layer connection between the first and second LLN border devices; or
   terminate a second tunnel, decapsulate an encapsulated data packet received via the second tunnel into a decapsulated packet, and forward the decapsulated packet to the second LLN border device via the neighboring link layer connection.

3. The method of claim 2, wherein the causing includes sending an instruction for the second LLN border device to operate as an ingress node for a third tunnel in the second DAG topology.

4. The method of claim 1, wherein the causing includes sending an instruction for the second LLN border device to operate as an ingress node for a tunnel in the second DAG topology.

5. The method of claim 1, wherein the first DAG topology and the second DAG topology operate in nonstoring mode, and wherein the causing includes:
   sending one or more instructions for deployment of a first tunnel in the first DAG topology according to one of a storing mode or a nonstoring mode;
   sending one or more instructions for deployment of a second tunnel in the second DAG topology according to one of a storing mode or a nonstoring mode; and
   the inter-PAN path providing the stitching between the first and second tunnels.

6. The method of claim 1, wherein the causing includes one of:
   sending one or more instructions for executing the stitching of first and second tunnels, originated in the first DAG topology and the second DAG topology, respectively, as stitched segments according to a storing mode;
   sending one or more instructions for executing the stitching of first and second tunnels, originated in the first DAG topology and the second DAG topology, respectively, as stitched segments according to a nonstoring mode; or
   sending one or more instructions for executing the stitching of the first and second tunnels as stitched tracks, according to a nonstoring mode.

7. The method of claim 1, wherein the second PAN is controlled by a second controller device, the generating of the inter-PAN path including receiving routing information from the second controller that is associated with the second DAG topology.

8. The method of claim 1, wherein the generating includes determining the first LLN border device is not a dominating set member in the first DAG topology, and determining the second LLN border device is not a dominating set member in the second DAG topology.

9. An apparatus implemented as a physical machine, the apparatus comprising:
   non-transitory machine readable media configured for storing executable machine readable code;
   a device interface circuit configured for receiving a data packet via a low power and lossy network (LLN); and a processor circuit configured for executing the machine readable code, and when executing the machine readable code operable for:

determining, by the apparatus implemented as a controller device in the LLN, that a first LLN border device is in a first personal area network (PAN) having a first directed acyclic graph (DAG) topology in the LLN, and that the first LLN border device is a neighbor of a second LLN border device in a second PAN of the LLN, the second PAN having a second DAG topology, receiving a path request for a third LLN device in the first PAN to reach a fourth LLN device, determining that the fourth LLN device is in the second PAN, generating an inter-PAN path between the third LLN device and the fourth LLN device via the first and second LLN border devices, the inter-PAN path providing a stitching between the first DAG topology and the second DAG topology, and causing the inter-PAN path to be deployed between the third LLN device and the fourth LLN device.

10. The apparatus of claim 9, wherein the causing includes sending an instruction for the first LLN border device to execute at least one of:

extend a first tunnel from the first LLN border device to the second LLN border device via a neighboring link layer connection between the first and second LLN border devices; or terminate a second tunnel, decapsulate an encapsulated data packet received via the second tunnel into a decapsulated packet, and forward the decapsulated packet to the second LLN border device via the neighboring link layer connection.

11. The apparatus of claim 10, wherein the causing includes sending an instruction for the second LLN border device to operate as an ingress node for a third tunnel in the second DAG topology.

12. The apparatus of claim 9, wherein the causing includes sending an instruction for the second LLN border device to operate as an ingress node for a tunnel in the second DAG topology.

13. The apparatus of claim 9, wherein the causing includes:

sending one or more instructions for deployment of a first tunnel in the first DAG topology according to one of a storing mode or a nonstoring mode;

sending one or more instructions for deployment of a second tunnel in the second DAG topology according to one of a storing mode or a nonstoring mode; and the inter-PAN path providing the stitching between the first and second tunnels.

14. The apparatus of claim 9, wherein the causing includes one of:

sending one or more instructions for executing the stitching of first and second tunnels, originated in the first DAG topology and the second DAG topology, respectively, as stitched segments according to a storing mode;

sending one or more instructions for executing the stitching of first and second tunnels, originated in the first DAG topology and the second DAG topology, respectively, as stitched segments according to a nonstoring mode; or sending one or more instructions for executing the stitching of the first and second tunnels as stitched tracks according to a nonstoring mode.

15. The apparatus of claim 9, wherein the second PAN is controlled by a second controller device, the generating of the inter-PAN path including receiving routing information from the second controller that is associated with the second DAG topology.

16. The apparatus of claim 9, wherein the generating includes determining the first LLN border device is not a dominating set member in the first DAG topology, and determining the second LLN border device is not a dominating set member in the second DAG topology.

17. One or more non-transitory tangible media encoded with logic for execution by a machine and when executed by the machine operable for:

determining, by the machine implemented as a controller device in a low power and lossy network (LLN), that a first LLN border device is in a first personal area network (PAN) having a first directed acyclic graph (DAG) topology in the LLN, and that the first LLN border device is a neighbor of a second LLN border device in a second PAN of the LLN, the second PAN having a second DAG topology;

receiving a path request for a third LLN device in the first PAN to reach a fourth LLN device;

determining that the fourth LLN device is in the second PAN;

generating an inter-PAN path between the third LLN device and the fourth LLN device via the first and second LLN border devices, the inter-PAN path providing a stitching between the first DAG topology and the second DAG topology; and causing the inter-PAN path to be deployed between the third LLN device and the fourth LLN device.

18. The one or more non-transitory tangible media of claim 17, wherein the causing includes sending an instruction for the first LLN border device to execute at least one of:

extend a first tunnel from the first LLN border device to the second LLN border device via a neighboring link layer connection between the first and second LLN border devices; or terminate a second tunnel, decapsulate an encapsulated data packet received via the second tunnel into a decapsulated packet, and forward the decapsulated packet to the second LLN border device via the neighboring link layer connection.

19. The one or more non-transitory tangible media of claim 17, wherein the causing includes:

sending one or more instructions for deployment of a first tunnel in the first DAG topology according to one of a storing mode or a nonstoring mode;

sending one or more instructions for deployment of a second tunnel in the second DAG topology according to one of a storing mode or a nonstoring mode; and the inter-PAN path providing the stitching between the first and second tunnels.

20. The one or more non-transitory tangible media of claim 17, wherein the generating includes determining the first LLN border device is not a dominating set member in the first DAG topology, and determining the second LLN border device is not a dominating set member in the second DAG topology.

* * * * *

UNITED STATES PATENT AND TRADEMARK OFFICE
CERTIFICATE OF CORRECTION

| | |
|---|---|
| PATENT NO. | : 11,539,613 B2 |
| APPLICATION NO. | : 17/213393 |
| DATED | : December 27, 2022 |
| INVENTOR(S) | : Pascal Thubert |

It is certified that error appears in the above-identified patent and that said Letters Patent is hereby corrected as shown below:

In the Specification

Column 2, Line 2, please amend as shown:
of the devices of FIGS. 1 or 6, according to an example Column 4, Line 67, please amend as shown:
as curved lines "(( ))") illustrated with the reference numeral Signed and Sealed this
Twenty-eighth Day of March, 2023

Katherine Kelly Vidal
*Director of the United States Patent and Trademark Office*